Oct. 19, 1937.   P. W. LEHMAN   2,096,362
METHOD AND APPARATUS FOR EXTRUDING RUBBER
Filed March 21, 1936   2 Sheets-Sheet 1
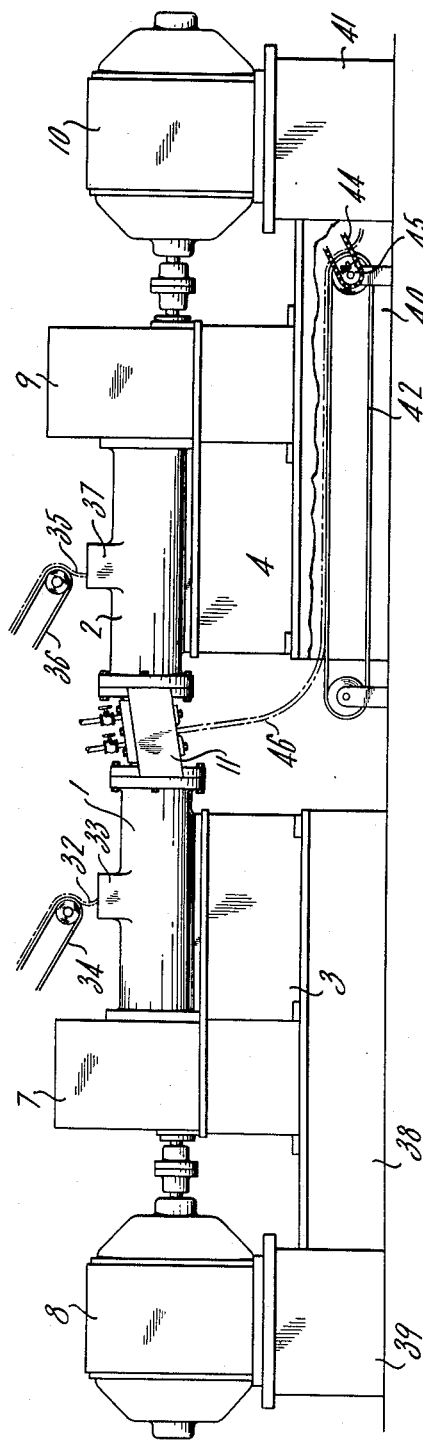
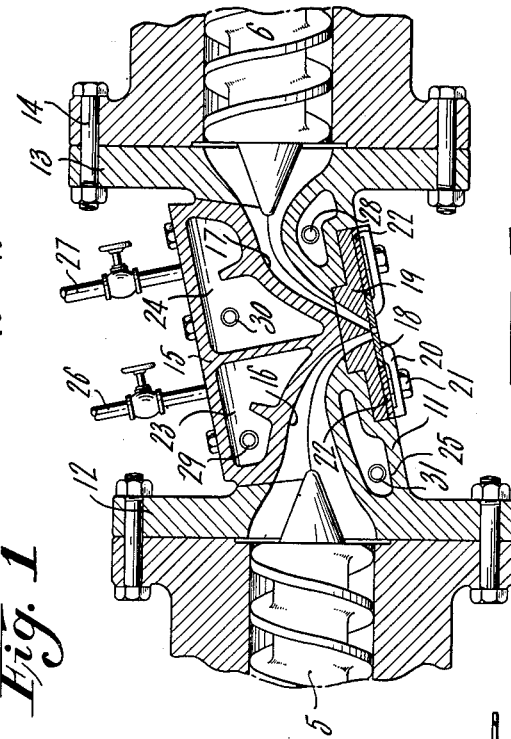
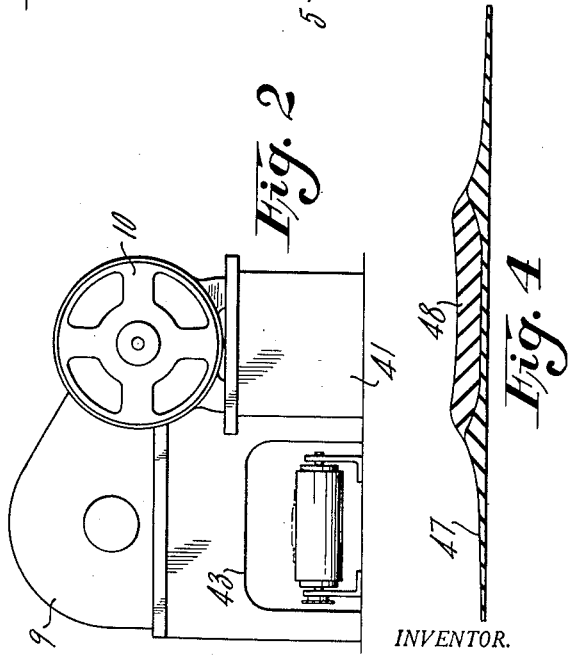
INVENTOR.
PAUL W. LEHMAN
BY
ATTORNEY.

Oct. 19, 1937.  P. W. LEHMAN  2,096,362
METHOD AND APPARATUS FOR EXTRUDING RUBBER
Filed March 21, 1936  2 Sheets-Sheet 2
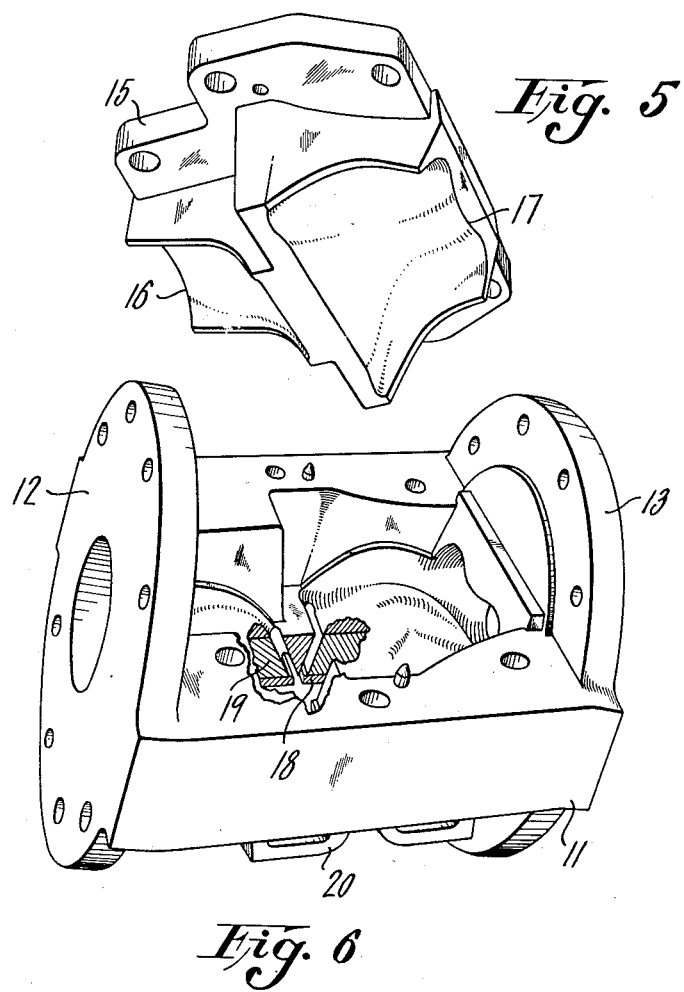
INVENTOR.
PAUL W. LEHMAN
BY
ATTORNEY.

Patented Oct. 19, 1937

2,096,362

UNITED STATES PATENT OFFICE 2,096,362

METHOD AND APPARATUS FOR EXTRUDING RUBBER

Paul W. Lehman, Grosse Pointe Park, Mich., assignor to United States Rubber Products, Inc., Detroit, Mich., a corporation of Delaware Application March 21, 1936, Serial No. 70,037

4 Claims. (Cl. 18—12)

My invention relates to extruding machines, and in particular it relates to the extrusion of a composite rubber product. More particularly the invention relates to the manufacture of composite rubber treads for pneumatic tires.

In the manufacture of pneumatic tires it is desirable to form the tread portion of the tire from two rubber stocks having different characteristics. For example, the ground contacting portion of the tread should be relatively tough and abrasive resistant, while the side wall portion of the tread need operate only as a carcass covering capable of withstanding the flexing movement of the tire. Also, it is sometimes desirable to change the color combination of the tread, a feature which can be carried out efficiently by the present invention.

Heretofore, composite treads have been manufactured by calendering and extruding methods. In extruding treads, and in particular composite treads, much difficulty has been experienced in controlling the cross-sectional dimensions of the extruded material as it emerges from the die head. It has been found that the direction in which the material emerges from the extruding head materially influences the control over a determination of the ultimate dimensions of the extruded material.

In some apparatus the treads are extruded horizontally, when it is necessary to provide a conveyor for taking the extruded material away as it emerges from the die head. Any variation in the travel of the conveyor or in the speed of the extruding machine results in a variation of the cross-sectional dimensions of the extruded material. In addition, as it is impractical to support the tread immediately after it is extruded, there is a constant tendency for the tread, as it emerges from the die head, to move downward due to gravity. In other words, it has been general practice to place the supporting conveyor in spaced relation with the die head.

Another prior method of extruding composite strip material was by positioning the die head in a manner so that the strip material emerged upwardly in a vertical plane. This method is likewise objectionable in that it requires accurate control between the conveyor speed and the speed of the extruded material as it leaves the die head. Furthermore, the upwardly extruded material requires substantially an immediate support in an angular position. This results in the strip incurring a sharp angle, from the vertical towards the horizontal, almost directly after it emerges from the die head.

When it is considered that the strip material is hot and in a plastic state as it emerges from the die head, it is obvious that it is readily susceptible to deformation. Accordingly, the manipulation of the strip material at the die head and for a short distance after it emerges therefrom, which may be termed controlling locations, exercises an important and critical function in determining the ultimate uniformity of the strip material.

My invention involves a method and apparatus for forming composite strips of rubber, and contemplates the use of two tubing machines having a common die head through which different compositions of rubber are brought together in predetermined merged relation and extruded from the die head in a downward movement. As the rubber stock leaves the die its downward movement is natural and consequently it is free from the deformation tendencies arising from extruding the rubber in a horizontal or upward direction.

Instead of extruding the rubber in a true vertical downward plane, I prefer to place the extruding head at a slight angle so that as the strip material is subsequently conveyed in a horizontal direction the material depending from the extruding head will be pulled slightly from its downward vertical path. In this way the extruded material will extend approximately at right angles from the face of the extruding head.

It is therefore an object of my invention to provide an efficient and accurate method and apparatus for extruding composite strip material.

Another object is to attain uniformity in extruding composite strip material.

A still further object is to extrude composite strip material in a manner which will insure a positive flow of the extruded material away from the die head.

These objects and advantages of the invention will be better understood in the following detailed description when considered in connection with the accompanying drawings, in which:—

Fig. 1 is a side elevational view of an embodiment of my invention;

Fig. 2 is an end elevational view thereof;

Fig. 3 is an enlarged longitudinal view, in section, of the die head;

Fig. 4 is a transverse view, in section, of a composite rubber product extruded in accordance with the practice of my invention;

Fig. 5 is a perspective view of the die cap; and

Fig. 6 is a perspective view, partially in section, of the interior of the die head.

Referring to the drawings, and particularly to Fig. 1, there is shown an extruding apparatus consisting of two conventional tubing machines comprising cylinders 1 and 2 supported by frames 3 and 4, respectively. Within the cylinders 1 and 2 are extruding screws 5 and 6, respectively. One end of the screw 5 connects with drive gears (not shown), within a gear housing 7, and with a motor 8. In a similar manner, the screw 6 connects with drive gears (not shown), within a gear housing 9, and with a motor 10.

The cylinders 1 and 2 of the tubing machines are horizontally disposed and positioned so that the extruding ends of the cylinders are in face to face relation. For reasons hereinafter explained one of the cylinders, 2, is located above the horizontal plane of the other cylinder 1. A die head 11 having flanges 12 and 13 is secured by bolts 14 to the ends of the cylinders 1 and 2. The difference in the elevation of the cylinders 1 and 2 permits the angular disposition of the die head 11. For the purpose of cleaning the interior of the die head and to facilitate its manufacture a portion of the die head 11 is in the form of a removable cap 15. Properly designed cavities 16 and 17 communicate with the openings within the cylinders 1 and 2, respectively, and in a converging manner terminate at a die plate 18. In keeping with practical design an insert 19 is interposed between the die plate 18 and the die head 11. The die plate 18 is secured to the die head by means of clamps 20 held in place by bolts 21. Spacer plates 22 serve to form a guide for the die plate 18.

To control plastication of the rubber within the die head, steam or hot or cold water may be circulated around the cavities 16 and 17. This is accomplished by providing chambers 23, 24 in the die cap 15 and a chamber 25 in the die head 11. Inlet conduits 26, 27, and 28 and outlet conduits 29, 30 and 31 communicate with the chambers 23, 24, and 25, respectively. In general practice steam or hot water is circulated through the chambers at the start of the extruding operation, and by controlling additional fittings (not shown) cold water is gradually substituted for the steam or hot water. In this way the heat generated by the extruding operation is dissipated, and the die head is maintained at a substantially uniform temperature.

Strips of rubber 32 of the desired characteristics are fed to the cylinder 1 through a feeding hopper 33 and conveyed thereto from a supply source by a conveyor 34. In a similar manner a strip of rubber 35 is conveyed from a source of supply by a conveyor 36 to a feeding hopper 37 of the cylinder 2.

The cylinder 1 and its supporting frame 3 are mounted on a base 38, and the motor 8 is mounted on a base 39. Cylinder 2 and its supporting frame 4 are mounted on a somewhat higher base 40, and the motor 10 is supported in proper alignment by a base 41. The increased elevation of the bases 40 and 41 permits the installation of a conveyor 42 beneath the frame 4. An arch or opening 43 (Fig. 2) in the base 40 provides clearance for the conveyor 42, which arch may be prolonged through the base 41, if necessary because of the alignment of the motor 10 with the cylinder 2. A chain 44 connected with a source of motive power and meshing with a sprocket 45 provides a drive for the conveyor.

By locating the cylinder 2 at an elevation higher than the cylinder 1, a two-fold purpose is accomplished. More space is provided for the conveyor 42 and the resulting angle of the die head between the cylinders is advantageous for the proper flow of the extruded strip material.

As shown in Fig. 1, the extruded strip material 46 as it is extruded from the die plate 18 assumes an angle inclined towards the direction of movement of the conveyor 42. Ordinarily the downwardly extruded strip material would flow in a direct or true vertical plane. However, due to movement of the conveyor in carrying the strip material to subsequent operations the downwardly depending material from the die head to the conveyor is moved from its vertical position towards the direction of movement of the conveyor. I find that good results are obtained by placing the die head at an angle between ten and fifteen degrees from the horizontal. In this way the apparatus functions so that the extruded strip material leaves the die plate substantially at an angle of ninety degrees from the surface from which it is extruded.

Fig. 4 illustrates one of the many shapes in which the composite strip material may be formed. This particular embodiment shows that the extruded material in the form of a tread for pneumatic tires and shows the side wall and sub-tread strip 47 formed from one type of rubber stock. The upper strip or tread proper 48 is merged with the strip 47 at the die 18 and forms that portion of the tread which is subjected to a greater degree of wear and abrasion. Accordingly, the upper strip of rubber is of a composition different than the side wall or sub-tread stock 47. Other combinations and dispositions of the various rubber stocks may be accomplished in accordance with the practice of my invention with equal efficiency.

While I have shown and described a preferred embodiment of my invention, it is to be understood that the invention may be otherwise practiced within the scope of the appended claims.

Having thus described my invention, what I claim and desire to protect by Letters Patent is:—

1. Extruding apparatus comprising a plurality of extruding units having their discharge ends in opposed relation, a die head connected to and between the discharge ends of said units, a die mounted in said head and having a discharge opening whose axis is inclined seventy-five to eighty degrees relative to a vertical plane passing therethrough whereby material is discharged from said opening in an inclined direction to said vertical plane.

2. Extruding apparatus comprising a plurality of extruding units having their discharge ends in opposed relation but at different elevations, a die head connected to and between the discharge ends of said units, a die mounted in said head with its outer face inclined from ten to fifteen degrees from the horizontal and having a discharge opening extending in a substantially rectangular direction to said outer surface whereby material discharged from the die leaves the die in substantially a straight line and at an angle to a vertical plane passing through the die opening.

3. In the method of extruding contractible rubber materials, the steps comprising releasing the rubber material from a die opening in a direction inclined from ten to fifteen degrees from a horizontal plane passing through the opening, suspending the material in air, and depositing it on a movable horizontal conveyor whereby contraction in the material may take place while it is suspended and variations in the conveyor and extruding speeds are compensated for by changes in the curvature of the suspended material and sharp bends therein are avoided.

4. Extruding apparatus comprising a pair of extruding units having their discharge ends in opposed relation, a die head disposed therebetween and having a single outlet in communication with both of the extruding units and opening in a downward direction and inclined from ten to fifteen degrees from the horizontal, and a conveyor disposed beneath the die head for receiving the material discharged from the die opening.

PAUL W. LEHMAN.